United States Patent Office 3,132,109
Patented May 5, 1964

3,132,109
POLYMERIZATION CATALYST COMPRISING PHOSPHORIC ACID AND SILICEOUS MATERIALS
Jacque C. Morrell, 8 Oxford St., Chevy Chase, Md.
No Drawing. Filed Apr. 2, 1959, Ser. No. 803,586
5 Claims. (Cl. 252—435)

This invention relates to polymerization catalysts and more particularly to improvements in those types of polymerization catalysts which contain as their principal ingredients a phosphoric acid and a natural porous silica material. The latter material is generally referred to as kieselguhr or infusorial earth and sometimes also as diatomaceous earth. In its most specific aspect my invention relates to improvements of the compression strength and hardness, and in general the wearing qualities of such polymerization catalysts which is at present a most important problem.

The catalysts produced from such mixtures of phosphoric acid and porous silica material, after baking and/or drying the same, have proven to be the best available catalysts for the polymerization of normally gaseous olefins to produce liquid hydrocarbon components of high octane motor and aviation fuels. The polymerization process has for a great many years been one of the most useful and important in the economy of petroleum refining for the conversion of otherwise practically waste gases resulting from both thermal and catalytic cracking into valuable components of motor fuels. The catalyst itself is highly active for the purpose, but its outstanding weakness has been its poor wearing qualities and its tendency to crumble and to dust during handling and use. This results in a relatively short life and frequent turnover of catalysts with the attendant increased costs. Despite the many years that this problem has existed and the many attempts to solve it, no satisfactory solution has been avialable to the industry and it is a prime object of the present invention to relieve the refining industry of the problem.

The polymerization catalysts described in my Patents Nos. 2,586,582 and 2,713,560 consisting of kaolin and phosphoric acid were an improvement so far as wearing qualities were concerned but the sacrifice in activity was too great to be economically feasible. However, various solutions of the problem are disclosed in copending applications. The catalyst products of these applications consist in a very minor amount of an additive combined with a major amount of a natural porous silica material such as kieselguhr and these in turn are combined with a much larger proportion of a phosphoric acid e.g. the latter may comprise from 75% to 85% and preferably in excess of 80% of the mixture. The final product is dried and baked. Thus a balance between wearing qualities and activity is achieved. Additional different solutions of the problem are shown in other copending applications.

In my present application I have made further improvements wherein I employ a catalyst composition comprising an additive mineral, the said additive mineral consisting of fullers earth being added or present in relatively minor proportions, in combination with a natural porous silica material of the class consisting of kieselguhr, infusorial earth and diatomaceous earth and incorporating the latter mixture with the maximum amount of a phosphoric acid, up to 80% and above; to achieve the desired balance of catalyst hardness and compression strength on the one hand and the polymerizing activity of the phosphoric acid on the other hand at relatively low cost. Each additive including those employed in my prior applications and the additive mineral fullers earth of the present application exerts its own individual characteristics both in the preparation of the catalyst and in its final properties and they are thus on a strictly non-equivalent basis.

Moreover, I have discovered that the manner in which these individual materials are incorporated with the other components of the catalyst as well as the materials themselves affect the quality of the final product. This further emphasizes the non-equivalency of the various additive materials which have been employed by me.

In carrying out the objects of my invention I incorporate from about 3% to 5% (and in general more than 1% of the material added that is the fuller's earth) at the low end of the range to from 10 to about 15% (and not to exceed 20%) at the high end all based on the mineral mix. The preferred range of the additive fullers earth is 5 to 10% of the mineral mix. The remainder of the mineral mix is substantially kieselguhr, also referred to as infusorial earth or diatomaceous earth. The preferred composition of the final product which for example contains 20% of the mineral mixture referred to above and 80% of a phosphoric acid may contain from about 1% to 2% only of the additive fullers earth based on the total mixture or 5% to 10% of the additive based on the mineral mix, i.e. the kieselguhr plus the fuller's earth. Some variations beyond the limits of the stated proportions are possible, but only at substantial sacrifice in the benefits of the composition. The mineral mix, i.e. the kieselguhr and additive is then admixed with from 70% to 85% (or more generally from 75% to 85%) of a phosphoric acid (calculated upon a basis of 100% phosphoric acid in the final mixture) and preferably in the range of 78% to 82% of the latter. In such cases the additive should preferably be present to the extent of about 5 to 10% based on the mineral mix, or 1 to 2% based on the total. This mixture may then be extruded and cut to proper size after which it is dried or baked by heating preferably in stages to from 500° F. to 700° F. (and somewhat higher for the catalyst mixture with high acid contents) for about 4 hours or longer; generally 600° F. to 750° F. for phosphoric acid contents of less than 80% and 750° F. to 850° F. and higher for phosphoric acid content above 80%.

Alternatively the dried product may be broken to size after drying, although the former procedure of extrusion is preferred.

The term fuller's earth is applied to an earthy material which resembles clay, but which unlike clay is almost totally devoid of plasticity. The bulk of the material is amorphous and is not readily identifiable. However, it is characterized by the presence of crystalline components particularly montmorillonite, an auxite and beidellite with crystalline quartz and limestone as accessories. Also it is an aluminum silicate type of porous structure. Generally it disintergrates into a powder when placed in water and is usually referred to as a non-plastic clay. Deposits are scattered in various parts of the United States with large deposits found in Florida, sometimes referred to as Floridin. It was originally used for scouring wool, hence the name fuller's earth. At present its principal use is for the filtration and refining of oils of both mineral and vegetable types.

Selected types of fuller's earth, sometimes refined and in general with less impurities and also generally of a lighter color than the very dark grey types have also been used and in some cases are preferred.

As I have pointed out previously, the fuller's earth in powdered form, may be mixed directly with the phosphoric acid, and has definite advantages, especially since it may be partially decomposed or may react in part with the acid during some stage of the process. Under the conditions of mixing with the acid, a smooth dispersion of the finely powdered fuller's earth in the phosphoric acid is obtained and this procedure offers advantages; although the alternatives of mixing the fuller's earth direct with the kieselguhr or working it in the mixture of kieselguhr and acid may in many cases be found desirable both from the viewpoint of the physical properties of the mixture as well as the final product.

It is obvious from the above discussion that there is not only a real difference in composition of my present catalyst from previous ones and from those of my copending applications, but there is, at the same time, a wholly unexpected result and great improvement in the hardness and compression strength of the present catalyst over that containing essentially only the kieselguhr and phosphoric acid. At the same time the product retains the high activity of the latter composition. The catalysts of the present invention are thus very greatly superior in all essential respects to those of the prior art, or those made essentially from kaolin and phosphoric acid or from kieselguhr and phosphoric acid alone on any basis of comparison. Thus my present composition exhibits a novel composition as well as significant utility over the prior art.

The porous silica ($SiO_2$) material, kieselguhr, as well as (infusorial earth and diatomaceous earth) are also quite different from kaolin both in chemical and physical characteristics and properties. They lack plasticity and the property of hardening which kaolin possesses. The latter (sometimes called china clay) is composed of silicon, oxygen and hydrogen corresponding to the general formual $Al_2O_3.2SiO_2.2H_2O$. It is derived from the weathering of feldspars. Kieselguhr (etc.) on the other hand, is made up of the skeletal remains of diatoms and is essentially $SiO_2$. The two materials also differ in crystal structure and X-ray pattern. In fact, there are no similarities between kaolin and kieselguhr so that a composition containing one of them is entirely different from the other. Moreover, both of these materials are entirely different from fuller's earth, and the latter is different from the other additives disclosed by me in copending applications.

The terms kieselguhr, infusorial earth and diatomaceous earth (also tripolite) are used interchangeably for example, in Hackh's Chemical Dictionary (1929), and all three terms are defined as a light earthy sedimentary rock consisting of the microscopic empty shells of diatoms. Infusorial earth, kieselguhr, diatomite, tripolite, diatomaceous earth-siliceous earth are similarly used interchangeably and are referred to as a fine powder composed of siliceous skeletons of diatoms sp. gr. 0.24–0.34 in Chemical and Technical Dictionary (1947) and similarly in Chemical and Engineering Dictionary (both by Chemical Publishing Co.) The terms are likewise used interchangeably in Webster's New Collegiate Dictionary (1951) (based on Webster's New International Dictionary); Winston's Simplified Dictionary, College Edition, 1938; and Practical Standard Dictionary, Funk and Wagnalls (1929), also the Merck Index, 1952 edition, and others. These materials are likewise sold and used interchangeably under these several terms; the major portion of all of them being up to as high as 90% $SiO_2$ in the form of porous siliceous skeletal substances. Large deposits of these materials occur in various locations, e.g. California, Nevada, Oregon, etc. As with all naturally occurring materials, the $SiO_2$ content and impurities show variations within the general class as well as within the individual deposits. The term kieselguhr, infusorial earth and diatomaceous earth and in general such naturally occurring porous siliceous materials will be used and referred to interchangeably and on an equivalent basis in connection with the present invention. Tests on various such products showed comparable results within the variations which might be expected, i.e. the presence of other substances in varying amounts besides the porous siliceous materials in the several types. These with the higher amounts of porous silica are preferred.

The various well known phosphoric acids (ortho, pyro and meta) as well as those less well known phosphoric acids (such as tetra-phosphoric) all come within the scope of my invention. These phosphoric acids are related to each other in that they may be formed by successive dehydration steps and conversely they may be made from phosphorous pentoxide by successive additions of the proper amounts of water to $P_2O_5$. Also the latter may be added to various concentrations of phosphoric acid, e.g. from 75% to 85% and higher and the resultant mixture may be assumed (as has been done in the prior art "to contain phosphorous pentoxide") that is to say that the latter has been added to the former. Alternatively the mixture may contain "a definite percentage of pyrophosphoric acid corresponding to the primary phase of dehydration of the orthophosphoric acid" or corresponding to the primary and secondary phases of hydration of the pentoxide. Meta phosphoric acid is also formed by the dehydration of ortho and pyrophosphoric acids or by the hydration of phosphorus pentoxide. Pyrophosphoric acid itself may be used at a temperature above its melting point of 140° F. but this is less desirable than the mixture. Therefore from the overall practical viewpoint and for convenience I prefer to use the orthophosphoric acid starting for example with the 85% commercial concentration (or diluting the latter as found desirable, e.g. from 75% to 85%) to which has been added various proportions of $P_2O_5$ (generally to a thick syrupy consistancy); as found suitable or necessary simultaneously to incorporate the necessary amount of phosphoric acid in the mixture and to obtain a material of proper consistency prior to forming and baking. It is desirable for maximum activity to incorporate the maximum amounts possible of phosphoric acid which will produce a mixture which can be readily extruded and heated without flowing or undue deformation of the mixture during heating. Phosphorous pentoxide dissolves readily in orthophosphoric acid of commercial grade generally about 85% concentration particularly at elevated temperatures so that it is principally a question of adjustment to obtain the desired concentration of the acid in the catalyst, e.g. about 80% or more by varying the concentration and amount of these two components, but of course, the other components must also be adjusted.

In order to ascertain readily the amounts of phosphoric acid present in the mixture especially for comparison, I determine the percentages on the basis of 100% orthophosphoric acid irrespective of the concentration present during mixing and of the form in which it may be present in the final product after heating.

The heavy stiff paste or mixture made by mixing the various materials generally in powdered form including the fuller's earth, the porous silica material, i.e. the kieselguhr and the phosphoric acid may be formed into pellets or preferably by extrusion into suitable shapes and cut into proper sizes generally ⅛ to ¼" diameter and about ¼" length or otherwise formed, or the dried and baked material may be sized later.

The consistency of the mixture before drying may vary somewhat depending on the temperature of mixing, the relative proportions of the components including the specific additive, the kieselguhr and the relative amount and concentration of phosphoric acid. It is desirable in all cases that the proportions of the materials be adjusted so that the mixture is stiff enough to be formed by extrusion and dried or baked without flowing or too much deformation. The application of a relatively small amount of heat at low temperatures, e.g. about 150° F. to 200° F. after mixing assists in congealing and thickening the mixture if necessary to permit forming although this may generally be avoided by proper formulation of all the components; and even by adjustment of any one of the components after mixing, by adding one or the other as required.

The formed catalyst may be dried and/or baked at temperatures varying from about 500° F. to about 650° F. and higher for several hours and upwards, for example 4 hours, except where the phosphoric acid content is above about 78%, e.g. from 79 to 81% and above in which case I may heat to temperatures from 650° F. to 800° F. and above. Preferably the heating is done in two stages, i.e. to about 200° F. to 250° F. for one-half to three-quarters hour and then to 600° F. to 750° F. for about three and one-half to four hours. The same time schedule may be used for the higher temperatures. For some special cases, for example with very high acid contents of from 80 to 85%, I may employ temperatures progressively higher, for example from 750° F. to 800° F. or from 800° F. to 900° F. (or higher as required) depending on the acid content. However, there is a definite correlation of the composition of my catalysts with temperatures and time of heating. The prior art polymerization catalysts generally require prolonged heating at temperatures up to and above 900° F. In some cases controlled rehydration of the baked catalysts, especially at the very high temperatures is required.

My invention thus produces a greatly superior product, more economically. It corrects vital deficiencies in respect of wearing qualities such as hardness and compression strength in the prior art catalysts while at the same time retaining the higher activity of the latter.

When used for polymerizing normally gaseous olefins, the granules or particles of catalyst are generally placed in treating towers and the gases containing olefins are passed downwardly through the towers at temperatures of 400 to 500° F. and pressures of several hundred pounds, e.g. 100 to 350 lbs. per square inch when employing stabilizer refluxes which contain e.g. 10 to 35% of propene and butenes. With gas mixtures containing normal and isobutene to obtain mixed polymerization the temperature may be lower, e.g. 250 to 350° F. with pressure of 500 to 800 lbs. per square inch, other reactions may be similarly carried out. It may also be desirable to introduce some steam during the reaction to maintain the normal vapor pressure of the catalyst; or the gas may be saturated with water vapor.

To remove carbonaceous or hydrocarbonaceous materials which form and deposit during the treatment the catalysts are reactivated by superheated steam and/or air or oxygen at temperatures varying from 500° to 1000° F. dependent on the concentrations of oxygen. The steam concentration may be increased toward the end of the burning off period and then both steam and temperatures may be decreased towards the very end.

The specific examples shown in the table following are typical of the proportions of materials used and the properties of the resulting products although they should not be construed as limiting either as to specific materials or proportions within the broad scope and spirit of my invention.

be expected with the varying conditions employed in the separate tests.

The table above shows the formulation and composition and in addition illustrate the characteristics of my improved polymerization catalysts, particularly with respect to structural or compression strength and hardness (resistance to abrasion) both of which are indexes of the wearing qualities and hardness. The structural or compressive strength tests represent the total thrust in pounds using the proving ring method on prepared representative specimens of fairly uniform size and shape (approximately ⅝″ to ¾″ cube) and represent the average of several comparative determinations on each type. The hardness data were made employing the Mohs mineral scale which is conventional in determining the relative hardness of minerals. The hardness and compression strength of a standard containing 80% phosphoric acid and 20% kieselguhr (with no additive present) made under similar conditions, i.e. heating the mixture up to 600° F. to 650° F. for 4 hours showed a hardness of about 1 on the same scale and compression strength of 10 to 15. Heating the standard to between 700° F. and 800° F. for an additional several hours increased these values (of the standard) for hardness to about 1+ and the compression strength to about 35.

While it may not be necessary to heat to temperatures as high as the foregoing, I have found it to be desirable where the phosphoric acid content is greater than about 79 and up to 80% and above. In these cases I obtain a very considerable improvement (much greater than that shown by the standard) by heating my product between 750° F. and 850° F. and higher. For example, in Example 5 the improvement in compression strength by heating to the higher temperatures was over 50 points and the hardness was also very considerably improved. Also, I have found in these cases that the optimum additive content is between 5% and 10%, based on the mineral mix and 1% to 2% on the total.

With regard to polymerization activity, the conventional method for the polymerization of propylene under controlled and comparable experimental conditions may be employed. The catalysts shown in the table varies within several percent only from the standard (about 97% to 101.0%) depending on the percentage of the additive, being in the lower range with the maximum additive and minimum phosphoric acid content shown in the table and highest with the minimum additive which produces the desired improvement in compression strength and hardness and maximum phosphoric acid content. These values are consistent with reported data on a standard polymeriza-

*Table I.—Fuller's Earth Additive*

|  | (1) |  | (2) |  | (3) |  | (4) |  | (5)[1] |  | (6)[2] |  |
|---|---|---|---|---|---|---|---|---|---|---|---|---|
| Pts. by wt. of $H_3PO_4$ | 72.0 |  | 72.0 |  | 72.0 |  | 75.0 |  | 78.5 |  | 75.0 |  |
| Pts. by wt. of $P_2O_5$ | 40.0 |  | 40.0 |  | 40.0 |  | 42.0 |  | 44.0 |  | 42.0 |  |
| Equiv. of 100% $H_3PO$ | 116.6 |  | 116.6 |  | 116.6 |  | 122.0 |  | 127.7 |  | 122.0 |  |
| Percent of 100% $H_3PO$ |  | 78.0 |  | 79.0 |  | 79.5 |  | 80.0 |  | 80.5 |  | 80.0 |
| Pts. by wt. of kieselguhr | 30.0 |  | 29.0 |  | 29.0 |  | 29.0 |  | 29.0 |  | 29.0 |  |
| Percent by wt. of kieselguhr |  | 20.2 |  | 19.8 |  | 19.8 |  | 19.0 |  | 18.3 |  | 19.0 |
| Pts. by wt. of additive | 3.0 |  | 2.0 |  | 1.2 |  | 1.5 |  | 1.5 |  | 1.5 |  |
| Percent of additive |  | 2.0 |  | 1.4 |  | 0.7 |  | 1.0 |  | 1.0 |  | 1.0 |
| Total, percent |  | 100.2 |  | 100.2 |  | 100.0 |  | 100.0 |  | 99.8 |  | 100.0 |
| Relative hardness | 1.5 |  | 2.0 |  | 1.5 |  | 2.5 |  | 2.5 |  | 2.5 |  |
| Relative compression strength | 140 |  | 175 |  | 130 |  | 225 |  | 200 |  | 250 |  |

[1] No. 5 was repeated employing a purified light fuller's earth with some improvement.
[2] No. 6 was prepared by mixing the fuller's earth direct with the mixture of phosphoric acid and $P_2O_5$ and subsequently with the kieselguhr. It was distinguished by a much superior product than the others when heated in the range of 650° F. to 750° F. as well as at the higher temperatures shown.

NOTE.—Preliminary heating of all products to 250° F. for about 1 hour; No. 1 was subsequently heated to from 600° F. to 650° F. for about 4 hours; No. 2 was heated in the range of 650° F. to 750° F. for about 4 hours; and Nos. 3, 4, 5, and 6 were heated in the range of 750° F. to 850° F. for about 4 hours.

As shown in the table, preparation of the samples employing the method of adding the fuller's earth direct to the phosphoric acid is preferred, because of superior results. The results were good in all cases but varied somewhat with different qualities of the additive, and as would tion catalyst containing about 80% phosphoric acid and 20% kieselguhr. The generally assigned activity of the latter is about 80. Additional phosphoric acid in the catalyst incorporated in the mixture may exceed the standard, although small differences may be negligible from a practical viewpoint considering the greatly increased value as a result of greatly increased hardness and compression strength and of the prolonged life of the catalysts produced according to my invention.

The general procedure for producing catalysts with activities higher than the standard is to increase the phosphoric acid contents by increasing both the $H_3PO_4$ and $P_2O_5$. The latter may be varied considerably as it readily dissolves in the 85% phosphoric acid on warming. The heavy liquid resulting from increased $P_2O_5$ permits a somewhat reduced proportion of kieselguhr or increased proportion of total phosphoric acid while at the same time maintaining proper workability of the mixture. For the higher phosphoric acid contents the additive should be between about 5% and 10% of the mineral mixture (kieselguhr and fuller's earth) or between 1% and 2% of the total, and the heating temperature should be increased as shown above, i.e., correlated with the acid content.

It is, of course, necessary in these special cases to maintain a proper and fairly close balance in the relative amounts of the various components including the phosphoric acid, the phosphorous pentoxide, the fuller's earth and kieselguhr in order to obtain an initial mixture that is workable, i.e. may be readily extruded and at the same time does not flow or deform on heating, and which at the same time will produce the desired hardness and compression strength while maintaining the activity of the final product.

In carrying out these formulations the sequence of mixing is a factor and as I have previously observed, there are advantages when the additive is added direct to the mixture of phosphoric acid and $P_2O_5$.

At the other end of the scale, I may, when desired, increase the kiselguhr content of the catalyst or the additive or both and reduce the phosphoric acid content, e.g. from 70 to 75% (or more) to make a catalyst of lower activity but otherwise of very high compression strength and hardness. The lower range of this special type represents a type which might be used only in very special cases, but the upper range, e.g. from 75% to 78% $H_3PO_4$ might find considerable use, e.g. in alkylation. However, the ranges between 78% and 82% $H_3PO_4$ (with corrections for additive) are preferred as these would be most widely employed for normal operations of polymerizing olefin gases to produce high octane motor fuels.

It is also to be emphasized that while not the most desirable procedure, adjustments in proportions of the components may be made after the initial mixture is made to develop certain desired properties.

As also pointed out previously, the procedure of mixing the additive disclosed herein with the mixture of phosphoric acid and phosphorous pentoxide is a part of my invention particularly from the process viewpoint and is preferred, for the reasons stated, over the procedure of mixing the fuller's earth and kieselguhr first and then with the phosphoric acid, or by mixing the kieselguhr and the phosphoric acid and then adding the fuller's earth, etc. However, all of these methods may be used and under some conditions the latter alternatives may be desirable. The proportions of the additive are also a general factor in my invention although not to be construed as limiting. Correlation of temperature and time of drying and/or baking with the phosphoric acid content of the mixture is also an important factor for best results in my process and catalyst product.

Moreover, it will be understood that there are many variations in initial concentrations of phosphoric acid, the percentages and amounts of phosphorus pentoxide, which may be incorporated therein; as well as the quality and proportions of kieselguhr and the additive required to give a mixture of the proper consistency to be extruded and to be heated without deformation or flowing of the material being heated, and at the same time to produce the requisite properties of activity, hardness and compressive strength. Also it must be understood that there are variations in composition of raw materials and for all of these factors as well as the temperatures and time periods for drying and/or baking, the necessary adjustments must be made.

It is to be further understood that some reaction may occur between the additive employed herein and the phosphoric acid, and therefore by the term additive as used in the claims, I include the additive as such and/or its reaction products in terms of the amounts of percentages of additives used and referred to as such. In view of all of the above, I do not desire to be unduly limited by these factors except as they are within the broad spirit and scope of my invention.

I claim:

1. A polymerization catalyst comprising a dried mixture of a phosphoric acid and an inorganic support, said support consisting essentially of a natural porous silica material selected from the class consisting of kieselguhr, infusorial earth and diatomaceous earth and an additive consisting essentially of fuller's earth, the said phosphoric acid comprising about 70% to 85% of the said mixture, said support containing not less than about 80% of the said porous silica material and less than about 20% and more than 1% of said additive, said support being further characterized in that the said porous silica material together with said additive comprises not more than about 30% of the mixture.

2. A polymerization catalyst comprising a dried mixture of a phosphoric acid and an inorganic support, said support consisting essentially of a natural porous silica material selected from the class consisting of kieselguhr, infusorial earth and diatomaceous earth and an additive consisting essentially of fuller's earth, the said phosphoric acid comprising about 75% to 85% of the said mixture, said support containing in the range of about 85% to 97% of the said porous silica material and in the range of 3% to 15% of said additive, said support being further characterized in that the said porous silica material together with said additive comprises less than about 25% of the mixture.

3. A polymerization catalyst comprising a dried mixture of a phosphoric acid and a mineral support, said support consisting essentially of a material selected from the class consisting of kieselguhr, infusorial earth and diatomaceous earth and an additive consisting essentially of fuller's earth, the said phosphoric acid comprising about 75% to 85% of the said mixture, said support containing not less than about 80% of the said material selected from the class consisting of kieselguhr, infusorial earth and diatomaceous earth and less than about 20% and more than 3% of said additive, said support being further characterized in that the said material selected from the class consisting of kieselguhr, infusorial earth and diatomaceous earth together with said additive comprises not more than about 25% of the mixture.

4. A polymerization catalyst comprising a dried mixture of a phosphoric acid and a mineral support, said support consisting of a material selected from the class consisting of kieselguhr, infusorial earth and diatomaceous earth and an additive consisting essentially of a selected fuller's earth reactive with said phosphoric acid comprising about 75% to 85% of the said mixture, said support containing not less than about 80% of the said material selected from the class consisting of kieselguhr, infusorial earth and diatomaceous earth and less than about 20% and more than about 3% of said additive, said support being further characterized in that the said material selected from the class consisting of kieselguhr, infusorial earth and diatomaceous earth together with said additive comprises not more than about 25% of the mixture.

5. An improved polymerization catalyst comprising a dried mixture of a phosphoric acid and an inorganic support, said support consisting essentially of a porous natural silica material selected from the group consisting of kieselguhr, infusorial earth and diatomaceous earth and of an additive consisting essentially of fuller's earth, the said additive being present in an amount of about 3% to 20% of the said inorganic support and less than about 10% of the total mixture, the said phosphoric acid comprising about 75% to about 85% of the total mixture and the remaining component of the said catalyst consisting essentially of said porous natural silica material.

References Cited in the file of this patent

UNITED STATES PATENTS

| | | |
|---|---|---|
| 1,993,512 | Ipatieff | Mar. 5, 1935 |
| 2,525,144 | Mavity | Oct. 10, 1950 |
| 2,692,242 | Bielawski | Oct. 19, 1954 |